(12) United States Patent
Guillemont et al.

(10) Patent No.: US 10,954,862 B2
(45) Date of Patent: Mar. 23, 2021

(54) COMPACT SPINAL TRANSMISSION

(71) Applicant: SAFRAN TRANSMISSION SYSTEMS, Colombes (FR)

(72) Inventors: Maxence Guillemont, Colombes (FR); Lionel Bauduin, Houilles (FR); Samuel Raymond Germain Becquerelle, Montigny le Bretonneux (FR); Julien Viel, Argenteuil (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 735 days.

(21) Appl. No.: 15/516,962

(22) PCT Filed: Oct. 6, 2015

(86) PCT No.: PCT/FR2015/052678
§ 371 (c)(1),
(2) Date: Apr. 5, 2017

(87) PCT Pub. No.: WO2016/055727
PCT Pub. Date: Apr. 14, 2016

(65) Prior Publication Data
US 2017/0298831 A1 Oct. 19, 2017

(30) Foreign Application Priority Data
Oct. 7, 2014 (FR) ...................................... 1459606

(51) Int. Cl.
*F02C 7/32* (2006.01)
*F16H 1/14* (2006.01)
*F16H 1/22* (2006.01)

(52) U.S. Cl.
CPC ................. *F02C 7/32* (2013.01); *F16H 1/14* (2013.01); *F16H 1/222* (2013.01); *F05D 2260/4031* (2013.01)

(58) Field of Classification Search
CPC ... F02C 7/32; F16H 1/14; F16H 1/222; F05D 2260/4031
See application file for complete search history.

(56) References Cited

U.S. PATENT DOCUMENTS 2,978,869 A * 4/1961 Hiscock .................... F02C 7/32
60/791
4,776,163 A * 10/1988 Brockmann .............. F02C 7/32
60/792

(Continued)

FOREIGN PATENT DOCUMENTS

EP 1980732 10/2008
EP 2522832 11/2012

(Continued)

OTHER PUBLICATIONS

French Search Report and Written Opinion, dated Jun. 2, 2015, French Application No. 1459606.

(Continued)

*Primary Examiner* — Vicky A Johnson
(74) *Attorney, Agent, or Firm* — Womble Bond Dickinson (US) LLP (57) ABSTRACT

The invention relates to an assembly comprising a drive gearbox (10) for an aircraft (1) and an accessory (30), the gearbox comprising: a connecting shaft (110) adapted to be driven by the propulsion system, a main shaft (120) adapted to be driven by the connecting shaft (110), and two bevel gears (122, 123) which are integral with the main shaft (120) and have different diameters ($d_{122}$, $d_{123}$), the accessory comprising: a high-speed accessory shaft (31) comprising a bevel gear (310), a low-speed accessory shaft (32) comprising a bevel gear (320), such that each gear (310, 320) on the accessory shafts (31, 32) meshes with one of the two bevel gears (122, 123) on the main shaft (120), so that the two (Continued)

accessory shafts (31, 32) rotate at different speeds relative to one another.

7 Claims, 8 Drawing Sheets

(56) References Cited

U.S. PATENT DOCUMENTS

| | | | | |
|---|---|---|---|---|
| 6,672,049 B2* | 1/2004 | Franchet | ................ | F02C 3/113 |
| | | | | 60/226.1 |
| 7,168,913 B2* | 1/2007 | Lardellier | ................ | F02C 7/32 |
| | | | | 415/122.1 |
| 7,758,302 B2* | 7/2010 | Linet | ................ | F02C 7/36 |
| | | | | 415/124.1 |
| 2009/0064683 A1* | 3/2009 | Moniz | ................ | F02C 7/275 |
| | | | | 60/792 |
| 2013/0247539 A1* | 9/2013 | Hoppe | ................ | F02C 7/32 |
| | | | | 60/39.15 |
| 2017/0298831 A1* | 10/2017 | Guillemont | ................ | F02C 7/32 |

FOREIGN PATENT DOCUMENTS

| | | |
|---|---|---|
| EP | 2530282 | 12/2012 |
| WO | WO-2014130239 | 8/2014 |

OTHER PUBLICATIONS

International Search Report and Written Opinion with English Language Translation, dated Jan. 28, 2016, Application No. PCT/FR2015/052678.

\* cited by examiner

COMPACT SPINAL TRANSMISSION

GENERAL TECHNICAL FIELD

The present invention relates to the field of turbine engines. It relates in particular to the mounting of auxiliary equipment and the mechanical transmission of power between a shaft of the engine, in a turbine engine, and this equipment using an accessory gearbox (AGB), or transfer gearboxes (TGB).

In other words, the invention relates to power transmission architectures allowing the so-called auxiliary equipment of an aircraft to be fed from the power produced by the propulsion unit, as well as the support of this equipment.

PRIOR ART

The accessory gearbox supports different auxiliary equipment, or accessories, mounted on the engine and necessary for its operation or that of the aircraft. These various accessories can in particular comprise a generator, a starter, an alternator, fuel or oil hydraulic-pumps, multistage lubrication units, etc. and are driven mechanically by the engine shaft by means of transmission shafts. The necessary power for driving accessories is generally drawn mechanically at the compressor of the turbine engine. The AGB is adapted to be implemented on an aircraft comprising a propulsion unit allowing setting said aircraft in motion. The propulsion unit is generally a turboprop or a turbojet.

Figure 1:
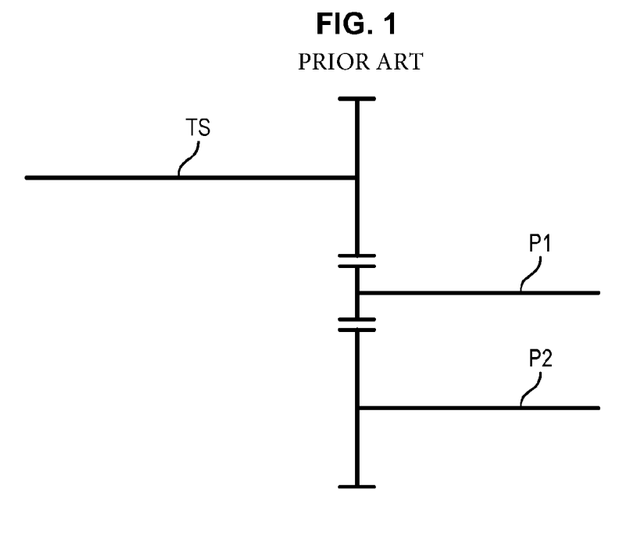
FIGS. 1 and 2 show AGBs conforming to the prior art.

There currently exist cascades of spur gears P1, P2, . . . , originating from a transfer shaft TS drawing power from the propulsion unit, each gear offering a different output speed (see FIG. 1).

Such a solution does not offer the compactness required for integrating the AGB or the reduction ratios necessary for the equipment (the range of speeds extends generally from 6000 to 24000 rpm).

In addition, there exist certain types of equipment each requiring several different input speeds. For example, the fuel pump has two pump stages each of which has an efficiency optimized at different rotation speeds. Consequently, imposing the same speed on the two stages reduces the performance of the pump and increases the bulk of the system. A two-speed output of the AGB would thus allow reducing the size of the equipment.

Figure 2:
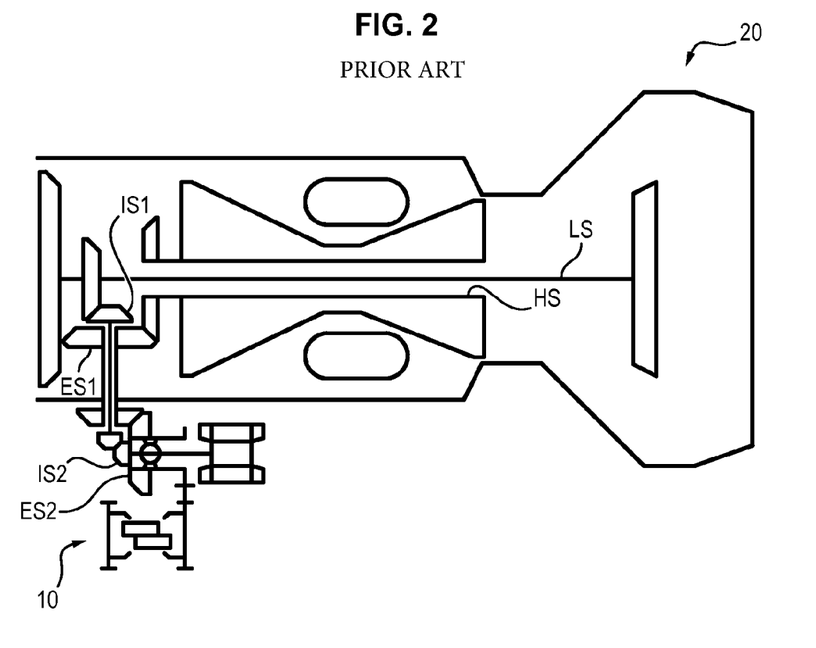

Document US 2013/0247539 describes an AGB 10 having two output speeds (see FIG. 2). A propulsion unit 20, comprising a low-speed propulsion shaft BS and a high-speed propulsion shaft HS feeds, via bevel gears, a dual power train consisting of concentric transmission shafts over the entire AGB 10. In fact, a first outer shaft ES1 is driven by the high-speed shaft HS and a first inner shaft IS is driven by the low-speed shaft LS. Thereafter the first outer shaft ES1, respectively inner shaft IS1, drives a second outer shaft ES2, respectively inner shaft IS2, so as to reorient the transmission along the input axes of the equipment.

As mentioned previously, the first external ES1 and internal IS1 shafts—respectively second shafts ES2, IS2—are concentric and each rotates at a different speed. In this manner, the AGB 10 effectively transmits two rotation speeds for feeding the equipment.

Such an architecture is cumbersome in terms of design and lifetime (maintenance of alignments, duplication of the transmission power train, hence multiplicity of parts, mechanical loads, etc.). Moreover, it requires adaptation to the propulsion unit 20, which limits its ability to integrate with existing units 20.

Consequently, there is no completely satisfying solution in terms of compactness. In addition, there also does not exist a completely satisfying solution in the case of feeding equipment at several speeds with reduced bulk. Moreover, solutions that can be implemented on aircraft without substantial modification of the propulsion unit or of the equipment are preferable.

Figure 3:
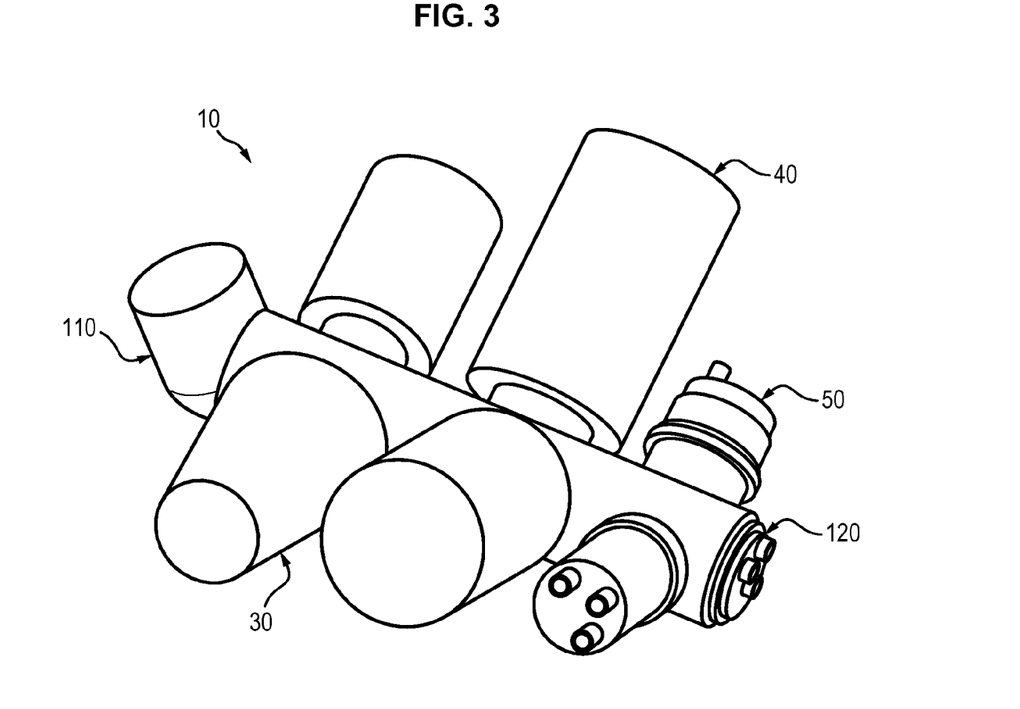
FIG. 3 shows a 3D view of an AGB conforming to the invention.

In addition, one direction of the design of AGBs 10 is oriented toward AGBs of the "core" type, as illustrated in FIG. 3, demanding in terms of compactness for locating the AGB 10 and the equipment 30, 40, 50, . . . .

PRESENTATION OF THE INVENTION

To this end, the invention proposes an assembly comprising a gearbox for driving an aircraft and a piece of equipment, said gearbox being adapted for transmitting the power of a propulsion unit of the aircraft to the piece of equipment, the gearbox comprising:
  A connection shaft, adapted for being driven by the propulsion unit,
  A main shaft, adapted for being driven by the connection shaft,
  Two bevel gears integral with the main shaft, said gears having different diameters,
  the equipment comprising:
  a high-speed equipment shaft comprising a bevel gear,
  a low-speed equipment shaft, comprising a bevel gear, characterized in that each gear of the equipment shafts is meshed respectively with one of the two bevel gears of the main shaft, so that the two equipment shafts rotate at different speeds from each other.

Thus the proposed architecture is compact, thanks to a downstream division of the power train of the transmission into two rotations with different speeds. Moreover, it makes it possible to feed equipment requiring two input speeds.

The invention also comprises the following features, taken alone or in combination:
  the bevel gears are placed facing one another, so that driving the two equipment shafts occurs in opposite directions,
  the connection shaft is tilted with respect to the main shaft, the equipment is a multistage fuel pump,
  the equipment is a multistage lubrication unit.

The invention also proposes a system comprising an assembly as previously described, further comprising a propulsion system, said propulsion system driving the connection shaft.

In addition, the assemblies or systems as previously described can comprise at least two pieces of equipment, the two pieces of equipment being driven by the same bevel gears of the gearbox.

In addition, the assemblies or systems as previously described have at least one bevel gear which is a spiral bevel gear.

The invention also proposes an aircraft comprising a system according to the foregoing presentation, wherein the propulsion system is a turboprop.

Independently, the invention also proposes an assembly comprising a gearbox for driving an aircraft and a piece of equipment, said gearbox being adapted for transmitting the power of a propulsion unit to the piece of equipment,
  the gearbox comprising:
    A connection shaft, adapted for being driven by the propulsion unit,
    A main shaft, adapted for being driven by the connection shaft, A bevel gear integral with the main shaft,
the equipment comprising:
  a high-speed equipment shaft,
  a low-speed equipment shaft,
  characterized in that a epicyclic gear train comprising an input shaft and an output shaft is positioned between the main shaft and the equipment, the input shaft comprising a bevel gear connected to the bevel gear of the main shaft and being integral in rotation with one of the two equipment shafts and the output shaft being integral in rotation with the other equipment shaft, so that the two drive shafts have different rotation speeds.

Independently, the invention also proposes a gearbox for driving the equipment of an aircraft adapted for transmitting the power of a propulsion unit to at least one piece of equipment, the transmission gearbox comprising:
  A connection shaft, adapted for being driven by the propulsion unit, comprising a bevel gear,
  A main shaft, comprising:
    a reception member in the form of a first bevel gear, adapted for being driven by the bevel gear of the connection shaft, and
    a second bevel gear, adapted to drive a piece of equipment,
  A secondary shaft, mounted coaxially on the main shaft and independent in rotation, comprising:
    a first bevel gear, adapted for being driven by the bevel gear of the connection shaft, and
    a second bevel gear, adapted to drive another piece of equipment,
  wherein the axis of the connection shaft and the axis of the main shaft are concurrent and form a non-right angle, and the bevel gear of the main shaft and the bevel gear of the secondary shaft, both adapted for being driven by the bevel gear of the connection shaft, have different geometries, so that the rotation speeds of the main shaft and of the secondary shaft are different.

The invention also proposes an assembly comprising a gearbox as previously described, further comprising a piece of equipment comprising a high-speed equipment shaft and a low-speed equipment shaft, characterized in that the two shafts are coaxial and in that the two shafts each have a bevel gear, wherein:
  one of the two gears is driven by the second bevel gear of the secondary shaft, and
  the other gear is driven by the second bevel gear of the main shaft,
  so that the two equipment shafts rotate at different speeds.

PRESENTATION OF THE FIGURES

Other features, aims and advantages of the invention will be revealed by the description that follows, which is purely illustrative and not limiting, and which must be read with reference to the appended drawings, wherein.

DETAILED DESCRIPTION

1$^{st}$ Embodiment

Figure 4:
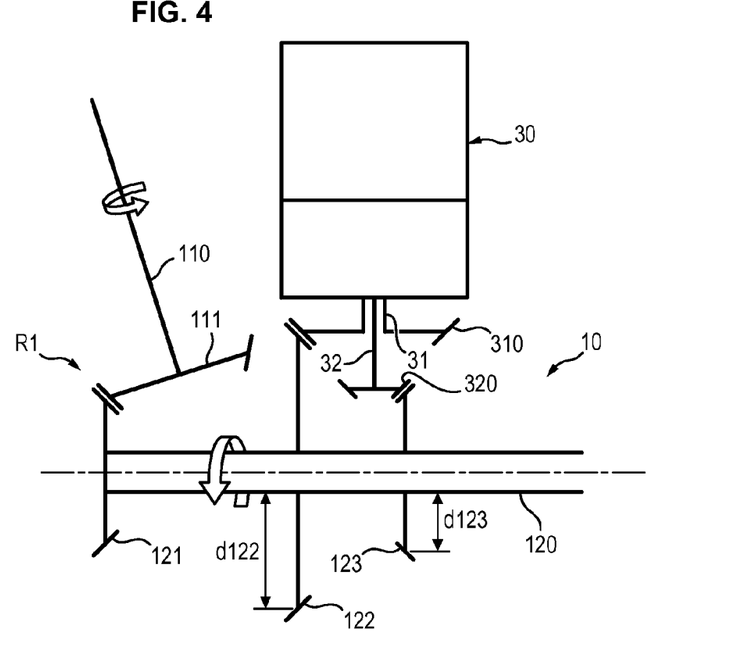
FIG. 4 shows a schematic of an AGB architecture conforming to a first embodiment.

Referring to FIGS. 3 and 4, the AGB 10 comprises first of all:
  a connection shaft 110 adapted to be meshed with the propulsion unit, said connection shaft 110 comprising a leading meshing member 111,
  a main shaft 120, comprising a receiving meshing member 121. The leading 111 and receiving 121 meshing members form a first bell crank R1.

The main shaft 120, due to its rotation, transmits mechanical power to the equipment 30, 40, . . . , 60. For this purpose, the mains shaft 120 further comprises a first bevel gear 122 and a second bevel gear 123 integral with the main shaft 120. What is meant by integral is integral in rotation due to a screw, welding or clamping connection. The two bevel gears 122, 123 have different respective diameters $d_{122}$, $d_{123}$ and different pitch angles $\delta_{122}$, $\delta_{123}$. The pitch angle is defined with respect to the shaft on which the bevel gear is mounted (see FIG. 5).

Figure 5:
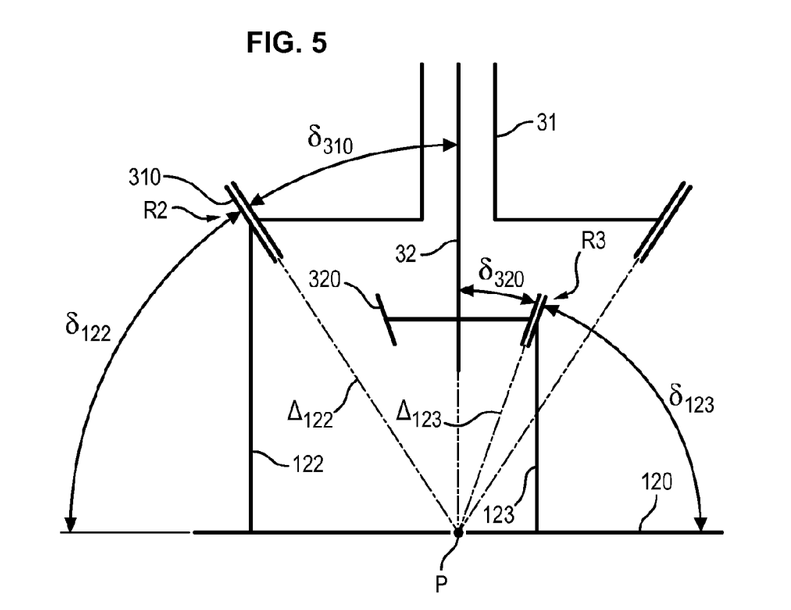
FIG. 5 shows a geometric feasibility schematic.

The pitch angles $\delta_{122}$, $\delta_{123}$ define axes $\Delta_{122}$, $\Delta_{123}$ which are concurrent at one point P.

The first bevel gear 122 comprises $Z_{122}$ teeth and the second bevel gear comprises $Z_{123}$ teeth. It is well understood that the number of teeth is directly correlated to the diameter of the gear.

According to a first variant, the bevel gears 122, 123 are placed facing one another, in other words the point P is situated between the two wheels 122, 123 (see FIG. 4) or the pitch angles $\delta_{122}$, $\delta_{123}$ defined in an oriented manner have opposite signs.

According to a second variant, the bevel gears 122, 123 are placed in series, in other words the point P is located outside the two gears 122, 123 (not shown in the figures) or the pitch angles $\delta_{122}$, $\delta_{123}$ defined in an oriented manner, have the same sign.

In this manner, the bevel gears 122, 123 are adapted for receiving a piece of equipment 30 requiring two input speeds. To that end, the equipment 30 comprises a first equipment shaft 31 and a second equipment shaft 32, the two shafts being concentric. When the equipment 30 is installed on the AGB 10, the axis defined by the two equipment shafts runs through the point P defined previously.

The first equipment shaft 31 comprises a bevel gear 310, with $Z_{310}$ teeth, which is meshed with the first bevel gear 122 of the main shaft 120. Said two bevel gears 122, 310 thus form a second bell crank R2.

The second equipment shaft 32 comprises a bevel gear 320, with $Z_{320}$ teeth, which is meshed with the second bevel gear 123 of the main shaft 120. Said two bevel gears 123, 320 thus form a third bell crank R3.

In order to allow the equipment 30 to be assembled, it is naturally necessary that the axes defined by the pitch angles $\delta_{30}$, $\delta_{320}$ of the bevel gears 310, 320 of the equipment shafts 31, 32 join at said point P.

Preferably, the equipment shafts 31, 32 are orthogonal to the main shaft 120 but such a condition is not necessary.

FIG. 5 illustrates the geometric feasibility of the architecture as well as the rotation speeds of the various shafts.

The speed of rotation of part i is designated $\omega_i$. Setting $d_{122} > d_{123}$ (and consequently $Z_{122} > Z_{123}$) and, arbitrarily $\delta_{122} < \delta_{123}$ with $\delta_{122} + \delta_{310} = \delta_{123} + \delta_{320a} = 90°$ (orthogonality of the shafts);

Thus, we have:

$$\omega_{31} = Z_{310}/Z_{122} \cdot \omega_{120} \cdot \tan(\delta_{122});$$

$$\Omega_{32} = Z_{320}/Z_{123} \cdot \omega_{120} \cdot \tan(\delta_{123});$$

but $\delta_{122} > \delta_{123}$, hence $\omega_{31} > \omega_{32}$.

Two coaxial equipment shafts 31, 32 are thus obtained, which rotate at different speeds. The speeds of the two shafts 31, 32 are thus independent, that is to say that by selecting suitable parameters, the speeds can be adjusted independently of one another, even if the two equipment shafts 31, 32 are driven by the same main shaft 120.

In fact, the reduction ratios depend directly on the number of teeth of the bevel gears 122, 123 of the main shaft 120 and the bevel gears 310, 320 of the equipment 30.

2$^{nd}$ Embodiment

The structure of the AGB is similar to that of the first embodiment, with the connection shaft 110 and the main shaft 120 with the first bell crank R1.

The main shaft 120 comprises a bevel gear 124.

An epicyclic gear train 13 is meshed with the bevel gear 124. The epicyclic gear train 13 comprises an entry sun gear 131, an output sun gear 132, at least one planet gear 133 and a planet carrier 134. The output sun gear also comprises an output shaft 132a.

According to a first alternative (see FIG. 6), the planet carrier 134 comprises a shaft 134a and a bevel gear 134b which is meshed with the bevel gear 124 of the main shaft 120. The equipment shafts 31, 32 are integral in rotation with respectively the planet carrier 134 and the output sun gear 132 (or the reverse), which for their part are rotating along the same axis at different speeds.

According to a second alternative (see FIG. 7), the input sun gear 131 comprises a shaft 131a and a bevel gear 131b which is meshed with the bevel gear 124 of the main gear 120. The equipment shafts 31, 32 are integral in rotation respectively with the input sun gear 131 and the output sun gear 132 (or the reverse), which are themselves rotating on the same axis at different speeds.

These alternatives are not limiting and are adaptable without difficulty for a person skilled in the art to different types of epicyclic gear trains. In fact, an epicyclic gear train is defined by three values of angular rotation (those of the input sun gear 131, of the output sun gear 132, and of the satellite carrier 133). Consequently, there exists a plurality of alternatives.

Figure 6:
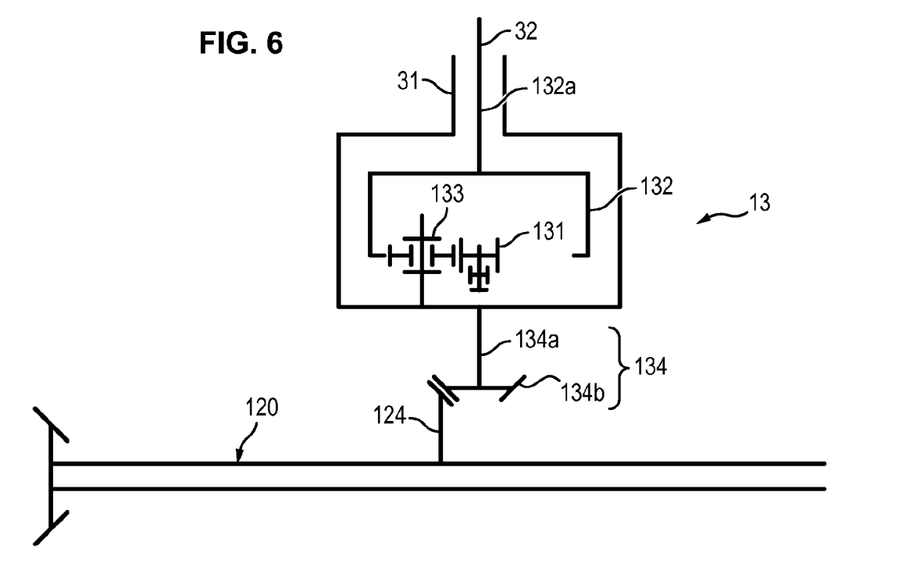
FIGS. 6 and 7 show a second embodiment.
Figure 7:
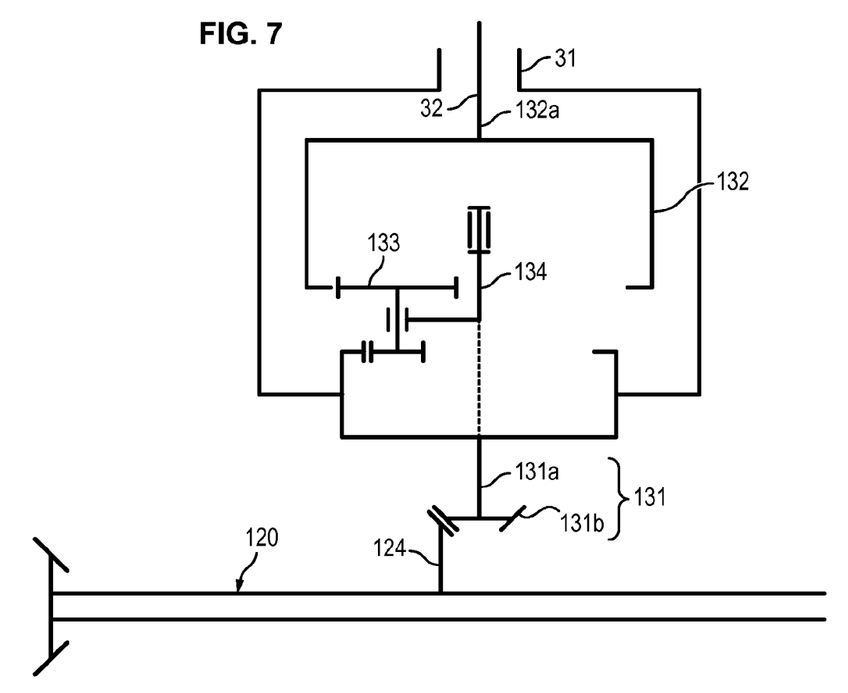

More generally, an input shaft 131a, 134a and an output shaft 132a, integral in rotation respectively with one of the two equipment shafts 31, 32 are defined. Moreover, the input shaft 131a comprises a bevel gear 131b, 134b driven by the bevel gear 124 of the main shaft.

3$^{rd}$ Embodiment

Figure 8:
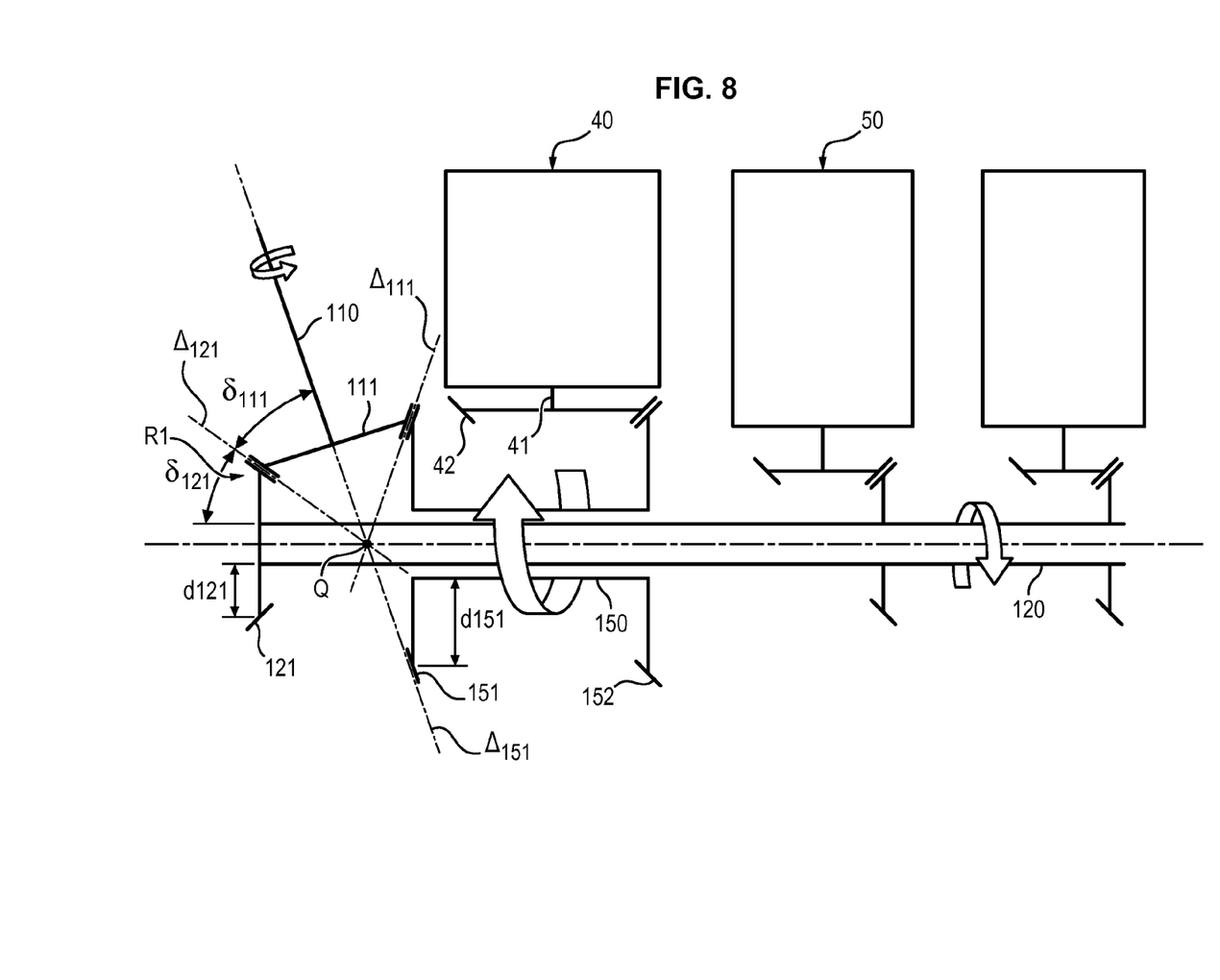
FIGS. 8 and 9 show a third embodiment.

Referring to FIG. 8, the bell crank R1 is strictly comprised between 0 and 90°, that is to say that the axes of the transfer shaft 110 and of the main shaft 120 do not define a right angle. To that end, the leading meshing member 111 of the connection shaft 110 is a bevel gear with pitch angle $\delta_{111}$ and the receiving meshing member 121 of the main shaft is a bevel gear with pitch angle $\delta_{121}$ and with diameter $d_{121}$. Recall that the pitch angle is defined with the shaft on which the bevel gear is mounted.

The pitch angles $\delta_{111}$, $\delta_{121}$ define axes $\Delta_{111}$, $\Delta_{121}$ which are concurrent at a point Q.

The connection shaft 110 is tilted with respect to the mains shaft 120, which means that the sum of the pitch angles $\delta_{111} + \delta_{121}$ is not equal to 90°.

In this embodiment, a secondary shaft 150 is assembled, concentric with the main shaft 120. This secondary shaft 150 comprises a first bevel gear 151 with diameter $d_{151}$ which is meshed with the bevel gear 111 of the connection shaft 110. For reasons of geometry, the axis $\Delta_{151}$ defined by the pitch angle $\delta_{151}$ also runs through the point Q.

Due to the non-orthogonality of the connection shaft 111 and of the main shaft 120, diameter $d_{121}$ is less than diameter $d_{151}$. Consequently, given that the bevel gears 121, 151 mesh with a common meshing part—the bevel gear 111, the rotation speeds of the main shaft 120 and of the secondary shaft 150 are different. Note also that the direction of rotation are different. The secondary shaft 150 comprises at least one second bevel gear 152, which feeds a piece of equipment 40 through the equipment shaft 41 and a bevel gear 42 on said shaft 41. In the present case, the equipment 40 requires only needs to be fed at one speed.

In a complementary fashion, the main shaft 120 comprises at least one other bevel gear 125 which meshes with another piece of equipment 50.

Thus, the architecture presented makes it possible to have different speeds for supplying different equipment.

Figure 9:
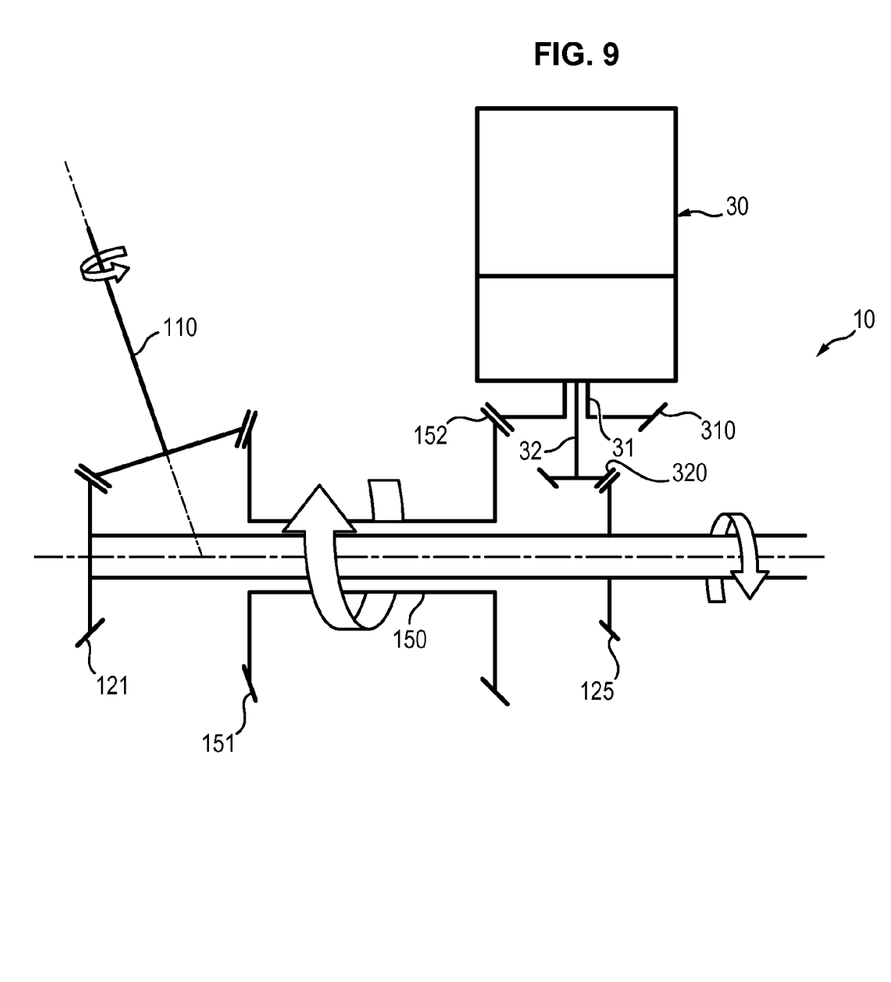

According to a variant of the third embodiment, the equipment 30 as defined in the first embodiment can be fed by the third embodiment. As shown in FIG. 9, in this variant, the bevel gear 152 of the secondary shaft 150 meshes with the bevel gear 310 of the equipment shaft 31 and the bevel gear 125 of the main shaft meshes with the bevel gear 320 of the equipment shaft 32.

In this manner, the third embodiment also makes it possible to feed a piece of equipment requiring two input speeds.

Figure 10:
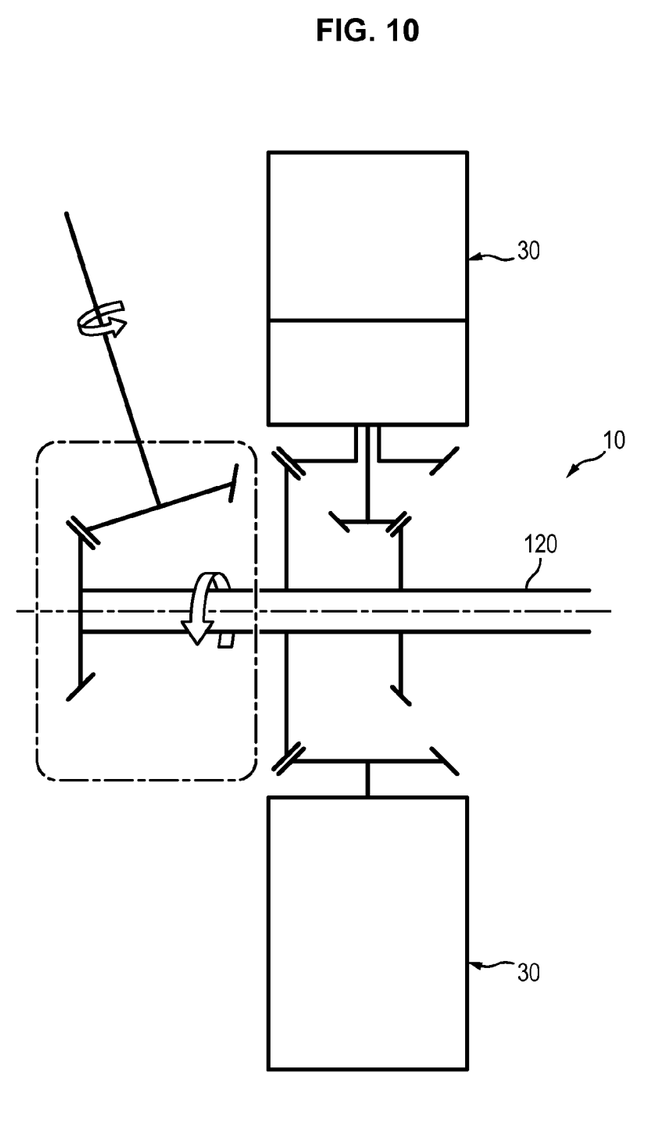
FIG. 10 shows several pieces of equipment driven by a single bevel gear.

In the foregoing description, each bevel gear of the main shaft 120 drives only one piece of equipment 30, 40, 50. For reasons of optimizing space and bulk, each bevel gear of the main shaft 120 can drive several pieces of equipment, by positioning them around the shaft, either at regular angular intervals (between 30° and 180° for example, see FIGS. 3 and 10) via multiple meshing.

Figure 11:
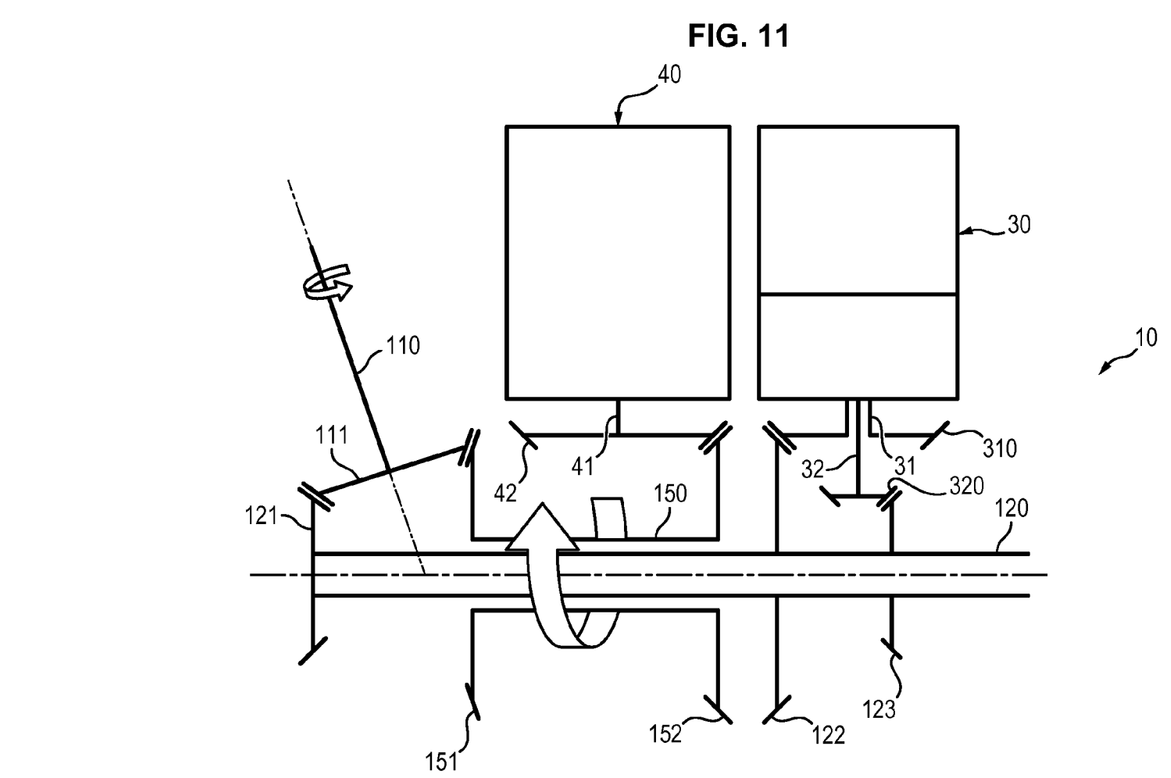
FIG. 11 shows the first and the third embodiments integrated in the same AGB.

Finally, the three embodiments are not exclusive and can be implemented two by two, or all three in the same AGB 10. FIG. 11 thus shows for example the first and third embodiments (with the two variants) on one AGB 10.

Advantageously, the bevel gears used to drive the different elements are spiral bevel gears, or Zérol® type gears, or hypoid gears, or more generally helical gearing.

Combinations of different types of gearing can be contemplated, depending on the type of power transfer, speeds of rotation and mechanical constraints.

The invention claimed is:

1. An assembly comprising: an accessory gearbox of an aircraft and a piece of equipment selected from among a multistage pump or a multistage lubrication unit,
   the gearbox configured to transmit power of a propulsion unit of the aircraft to the piece of equipment,
   the gearbox comprising:
     a connection shaft located to be operatively coupled to the propulsion unit, a main shaft operatively coupled to the connection shaft, and two bevel gears integral with the main shaft, the bevel gears having different diameters, and the piece of equipment comprising:

a high-speed equipment shaft comprising a bevel gear, and a low-speed equipment shaft comprising a bevel gear, wherein each bevel gear of the respective equipment shafts is meshed respectively with one bevel gear of the two bevel gears of the main shaft such that the two equipment shafts rotate at different speeds from each other when driven by the main shaft.

2. The assembly according to claim 1, wherein the bevel gears of the gearbox are placed facing one another such that the two equipment shafts are configured to be driven in opposite directions.

3. The assembly according to claim 2, wherein the connection shaft is tilted with respect to the main shaft.

4. The assembly according to claim 1, further comprising the propulsion unit.

5. The assembly according to claim 1, comprising at least two pieces of equipment, the two pieces of equipment configured to be driven by the bevel gears of the gearbox.

6. The assembly according to claim 1, wherein at least one bevel gear of the two bevel gears of the gearbox and the bevel gears of the piece of equipment is a spiral bevel or hypoid gear.

7. An aircraft comprising the assembly according to claim 6, wherein the propulsion unit is a turboprop.

* * * * *